May 30, 1944.   L. W. McALPINE   2,350,242
AIR BRAKE CYLINDER RELEASE VALVE
Filed Sept. 24, 1941   2 Sheets-Sheet 1
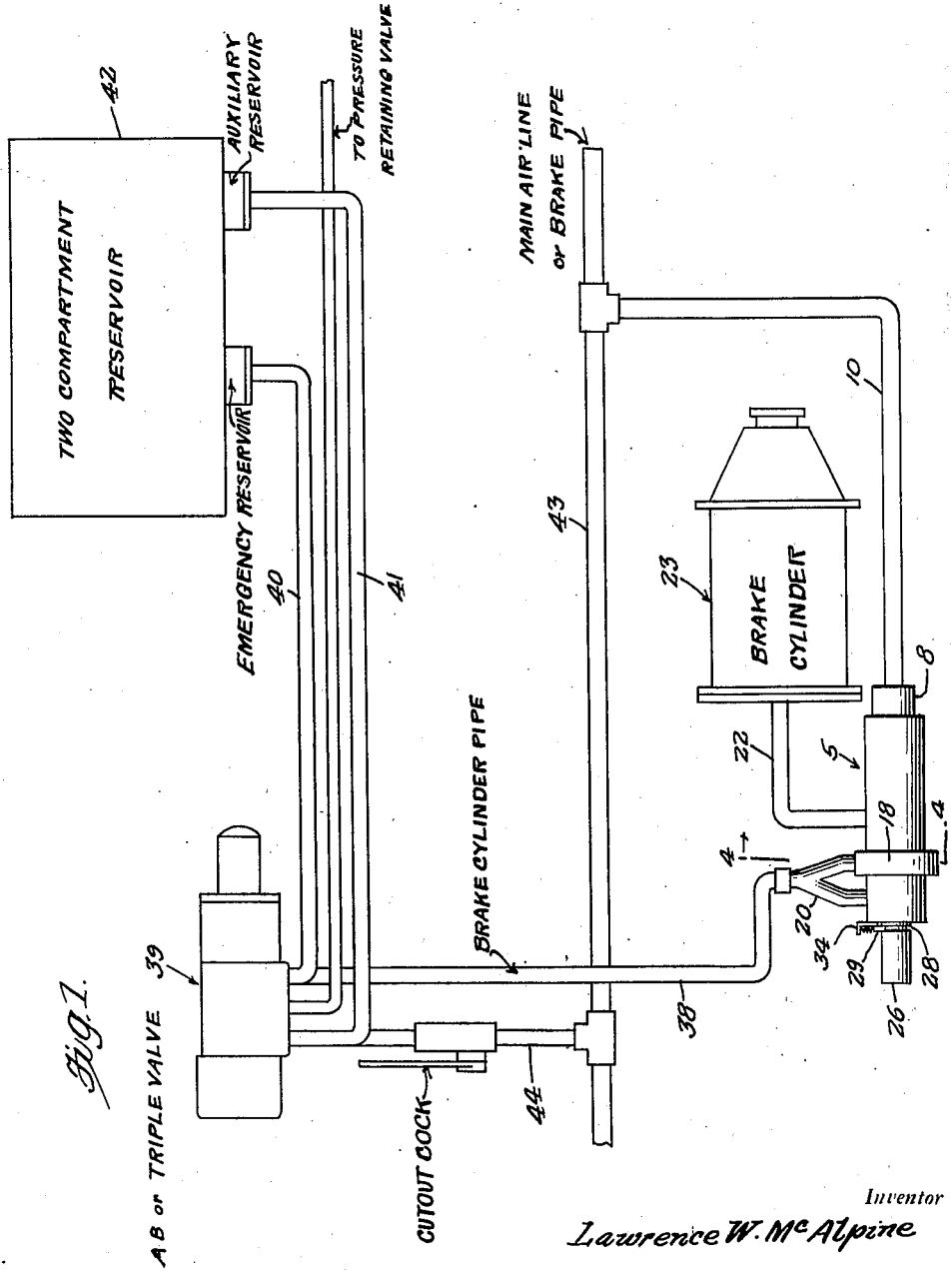
Inventor
Lawrence W. McAlpine
By Clarence A. O'Brien
Attorney May 30, 1944.   L. W. McALPINE   2,350,242
AIR BRAKE CYLINDER RELEASE VALVE
Filed Sept. 24, 1941   2 Sheets-Sheet 2
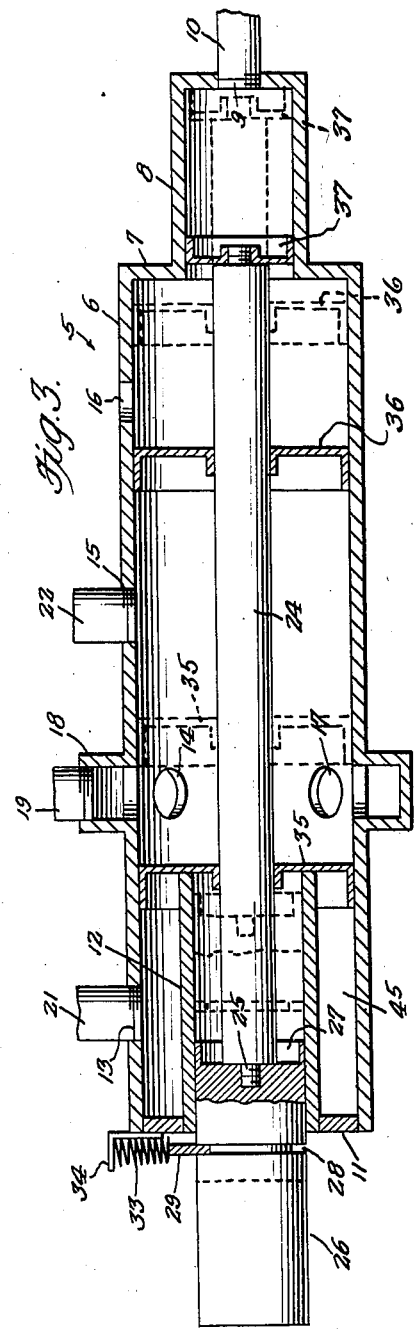
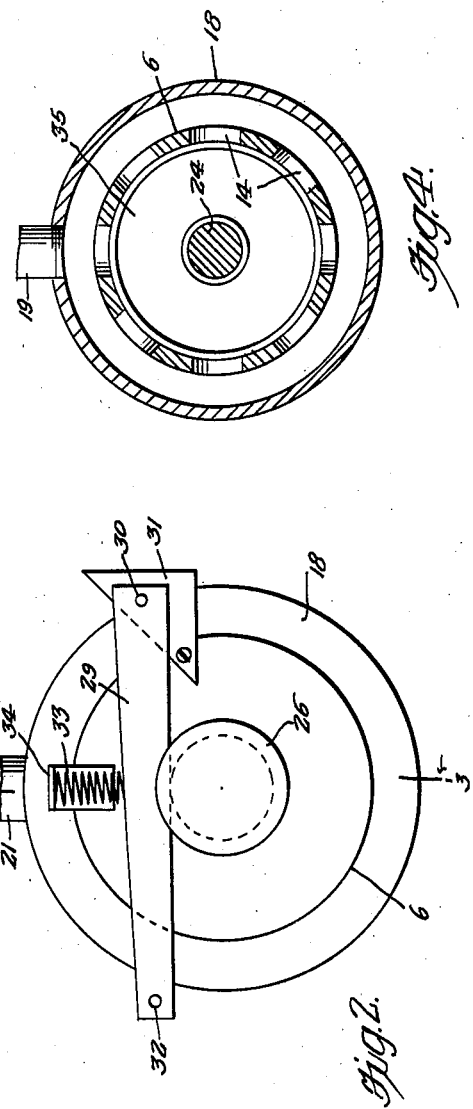
Inventor
Lawrence W. McAlpine
By Clarence A. O'Brien
Attorney Patented May 30, 1944

2,350,242

UNITED STATES PATENT OFFICE 2,350,242

AIR BRAKE CYLINDER RELEASE VALVE

Lawrence W. McAlpine, Savannah, Ga., assignor of twenty per cent to Lawrence W. McAlpine, Jr., Savannah, Ga., and twenty per cent to William E. Corr, Norfolk, Va.

Application September 24, 1941, Serial No. 412,174

6 Claims. (Cl. 303—68)

My invention relates to improvements in air brake systems as utilized in railway cars, and particularly to a manually operable release valve for substantially instantaneously bleeding the brake cylinders on a car without releasing the unused air pressure in the auxiliary and emergency reservoirs when two or more cars are to be separated, so that the time and trouble presently involved in bleeding the entire braking equipment before making up new trains and then recharging the entire system when the train is made up are reduced, and the primary object of my invention is to provide a simple, practical and efficient arrangement of the character indicated which requires replacement only of the air released from the brake cylinder and brake pipe to recharge the brake system, and hence saves much operation and wear and tear on the air pumps.

Other important objects and advantages of my invention will be apparent from a reading of the following description taken in connection with the appended drawings, wherein for purposes of illustration I have shown a preferred embodiment of my invention.

In the drawings:

Figure 1 is a general schematic view showing the location and operative arrangement of the invention in an air brake system.

Figure 2 is an enlarged left hand end elevational view of the release valve showing the latch thereof.

Figure 3 is a longitudinal vertical sectional view taken through the release valve and showing the same in operative position wherein the train is being handled by air.

Figure 4 is an enlarged transverse vertical sectional view taken through Figure 1 along the line 4—4 and looking toward the right in the direction of the arrow.

Referring to the drawings in detail, the numeral 5 generally designates the present release valve which preferably, although not necessarily, consists of an elongated cylinder 6 having a portion of its right hand end closed by an end wall 7 which comprises the concentric reduced cylinder 8 which has communication as indicated by the numeral 9 only with the main air line or brake pipe 10. From the end wall 7 to the left hand end of the cylinder 6 the cylinder 6 is substantially uniform in diameter and at its left hand end has an internal flange 11 which acts as a partial closure for that end of the cylinder and as a support for the reduced internal cylinder 12 which is arranged concentrically with respect to the cylinder 6.

The side wall of the cylinder 6 has the longitudinally spaced ports 13, 14, 15 and 16. The ports 13, 15 and 16 are longitudinally aligned single openings, while the port 14 consists of a series of circumferentially spaced openings 17 which have communication with an external manifold 18 encircling the cylinder 6. One leg 19 of a Y-shaped pipe 20 has connection with the manifold 18, while the remaining leg of the Y-shaped pipe has connection as indicated by the numeral 21 with the port 13.

The port 15 is connected by the pipe 22 directly with the brake cylinder 23, while the port 16 is open to the atmosphere.

Slidable within the cylinder 6 is a compound piston arrangement which is characterized by a single piston rod 24. At its left hand end the piston rod has a reduced shank 25 which is threaded into a solid cylindrical follower or piston 26 whose inner end is cupped as indicated by the numeral 27.

A portion of the piston 26 is slidable within the cylinder 12 and another portion thereof is exposed at the left hand end of the cylinder 6 as indicated in Figure 3 of the drawings. That portion of the piston 26 which is thus exposed is provided with a circumferential latching groove 28 into which is adapted to fall a latch bar 29 which is pivoted as indicated by the numeral 30 on a suitable bracket 31 secured to the cylinder end, the free end of the latch bar 29 being apertured or otherwise equipped as indicated by the numeral 32 for connection with an operating cable or lever (not shown) mounted in a suitably convenient place on the car for operation by the brakeman. A vertical expanding spring 33 presses downwardly on the top of the latch bar 29 from a bracket 34 mounted on the cylinder end as shown, so that whenever the piston 26 moves relative to the latch bar 29 so as to register the groove 28 with the latch bar, the latch bar will be pressed into place in the groove and thereby prevent further longitudinal or axial movement of the piston 26 and the piston rod 24 which is connected thereto. The manual operation is employed only to withdraw the latch 29 from the groove 28 in the manner and for purposes explained below.

On the piston rod 24 are two cup-shaped pistons 35 and 36, respectively, which in the present instance face toward the left hand end of the cylinder. The piston 35 is secured to the piston rod 24 at a point such that in the operative position shown in Figure 3 of the drawings, the piston 35 abuts the open end of the cylinder 12 and at the same time is located between and cuts off communication between the ports 13 and 14, with the latch bar 29 in place in the groove 28. In this position of the device the piston 36 is located between and cuts off communication between the ports 15 and 16.

A small piston 37 is fixed on the right hand end of the piston rod 24 and is located for action solely within the small cylinder 8. In the operative position of the device this small piston is located adjacent the left hand end of the small cylinder 8.

Referring to Figure 1 of the drawings, it is seen that the release valve 5 is connected in the brake cylinder branch pipe 38 between the triple valve or A B valve 39 of a conventional air brake system and the brake cylinder 23, the triple or A B valve 39 being connected by pipes 40 and 41 with the usual emergency and auxiliary chambers of the reservoir 42. The main air line or brake pipe 43 is connected at 44 with the triple valve or A B, as the case may be, and at 10 with the right hand end of the release valve 5. The release valve 5 is thus connected in the brake cylinder pipe by connecting one side of the pipe with the Y-shaped pipe 20 and the other side with the port 15 as at 22.

When it is desired to utilize the present invention to bleed the brake system preceding detachment of cars, the brake pipe pressure having been reduced in the usual manner, the manual means of a suitable character already alluded to is used to raise the latch 29 so as to allow the air pressure accumulated in the chamber 45 at the left hand side of the piston 35, and in the space between the pistons 35 and 36 to push the compound piston assembly toward the right to a position in which the piston 35 blocks the ports 14 and 22 to hold the unused air in the reservoir. In this position the piston 36 is to the right of the port 16 so as to connect the ports 15 and 16, thereby allowing the compressed air within the brake cylinder 23 to escape through the pipe 22 into the cylinder 6 and exhaust to the atmosphere through the port 16.

When the car is replaced in train and the brake system is to be recharged, the pressure in the main air line or brake pipe 43 is restored in the usual manner and this pressure is communicated to the small cylinder 8. The pressure against the small piston 37 then being greater than the pressure in the chamber 45, the piston assembly moves toward the left from the bleeding position to the operating position shown in Figure 3 of the drawings, wherein the brake system is fully operative.

It will be observed that the usual time required to bleed off 100 cars is about 50 minutes. The present device will bleed the brake cylinders as fast as the length of the one hundred cars can be walked, or roughly in 15 minutes. This saving in terminal delay and in money for the services of a switch crew and sometimes those of a road crew which may be waiting to make up a train, are very substantial.

It will also be observed that the present practice of bleeding the air on a car or train consists of draining all of the air from the brake system, necessitating recharging of the entire brake system when placed in train again, which recharging requires from seven to fifteen minutes, and there is considerable wear and tear on the pumps and other mechanism involved. In the case of the present invention it is only necessary to release the air from the brake cylinders in the manner already explained to make a car ready for switching, and the brake system is recharged ready for action simply by recharging the main air line or brake pipe and the brake reservoirs to replace only that portion of the air supply which was used in applying the brakes preceding the separation of the cars, since the air in the reservoirs is not released but is retained when the brake cylinders are bled by the operation of the present invention.

Although I have shown and described herein a preferred embodiment of my invention, it is to be definitely understood that I do not wish to limit the application of my invention thereto, except as may be required by the scope of the subjoined claims.

Having thus described the invention, what is claimed as new is:

1. In an air brake system comprising a reservoir, an automatic valve, a main air line connected to said automatic valve, and a brake cylinder, a release valve arranged between said brake cylinder and said automatic valve, said release valve being operable to close communication between said automatic valve and said brake cylinder and bleed said brake cylinder to the atmosphere, said release valve comprising a main cylinder having a reduced external cylinder at one end in communication with said main cylinder and an internal cylinder opening into said main cylinder at the opposite end of said main cylinder, said reduced external cylinder being connected to said main air line, a bleed port in the wall of said main cylinder opening to the atmosphere adjacent said reduced external cylinder, a brake cylinder port located longitudinally inwardly from said bleed port, first and second automatic valve ports longitudinally spaced adjacent the opposite end of the cylinder, a compound piston comprising a piston rod reciprocable in said main cylinder, said piston rod having a reduced piston to work in said reduced external cylinder, a pair of main pistons spaced along said piston rod and working in said main cylinder, and a solid piston working through said internal cylinder, said piston rod and said main pistons being arranged to normally occupy positions in which communication between said first and second ports is cut-off within said main cylinder and wherein communication between said brake cylinder port and said bleed port is cut-off within said main cylinder and said brake cylinder is in effective condition, latch means on said main cylinder arranged to engage said solid piston to retain said normal positions of the main pistons, said latch means being releasable from said solid piston to permit the air pressure from one of said automatic valve ports to work against one of said main pistons to move said piston rod and pistons to positions in which said bleed port and said brake cylinder port are in communication to bleed the brake cylinder.

2. An air brake system according to claim 1 wherein said main piston rod has a further piston in said reduced external cylinder with an air connection between said external cylinder and said main airline whereby entry of air pressure into said reduced external cylinder operates to restore said main piston rod and its pistons to their normal positions as the main airline pressure is brought up to normal.

3. In an air brake system comprising a reservoir, an automatic valve, a main air line connected to said automatic valve, and a brake cylinder, a release valve arranged between said brake cylinder and said automatic valve, said release valve being operable to close communication between said automatic valve and said brake cylinder and bleed said brake cylinder to the atmosphere, said release valve comprising a main cylinder having a reduced external cylinder at one end in communication with said main cylinder and an internal cylinder opening into said main cylinder at the opposite end of said main cylinder, said reduced external cylinder being connected to said main air line, a bleed port in the wall of said main cylinder opening to the atmosphere adjacent said reduced external cylinder, a brake cylinder port located longitudinally inwardly from said bleed port, first and second automatic valve ports longitudinally spaced adjacent the opposite end of the cylinder, a compound piston comprising a piston rod reciprocable in said main cylinder, said piston rod having a reduced piston to work in said reduced external cylinder, a pair of main pistons spaced along said piston rod and working in said main cylinder, and a solid piston working through said internal cylinder, said piston rod and said main pistons being arranged to normally occupy positions in which communication between said first and second ports is cut-off within said main cylinder and wherein communication between said brake cylinder port and said bleed port is cut-off within said main cylinder and said brake cylinder is in effective condition, latch means on said main cylinder arranged to engage said solid piston to retain said normal positions of the main pistons, said latch means being releasable from said solid piston to permit the air pressure from one of said automatic valve ports to work against one of said main pistons to move said piston rod and pistons to positions in which said bleed port and said brake cylinder port are in communication to bleed the brake cylinder, means for intercepting a portion of the air moving to the brake cylinder during a brake application whereby to cause the piston assembly to move to abnormal position when said latch means is manually operated to release the main piston to the effect of such intercepted pressure, and means for holding said pressure to resist return of said piston assembly to normal position until said automatic valve and allied parts have released said pressure to the atmosphere.

4. In an air brake system comprising a reservoir, an automatic valve, a main air line connected to said automatic valve, and a brake cylinder, a release valve arranged between said brake cylinder and said automatic valve, said release valve being operable to close communication between said automatic valve and said brake cylinder and bleed said brake cylinder to the atmosphere, said release valve comprising a main cylinder having a reduced external cylinder at one end in communication with said main cylinder and an internal cylinder opening into said main cylinder at the opposite end of said main cylinder, said reduced external cylinder being connected to said main air line, a bleed port in the wall of said main cylinder opening to the atmosphere adjacent said reduced external cylinder, a brake cylinder port located longitudinally inwardly from said bleed port, first and second automatic valve ports longitudinally spaced adjacent the opposite end of the cylinder, a compound piston comprising a piston rod reciprocable in said main cylinder, said piston rod having a reduced piston to work in said reduced external cylinder, a pair of main pistons spaced along said piston rod and working in said main cylinder, and a solid piston working through said internal cylinder, said piston rod and said main pistons being arranged to normally occupy positions in which communication between said first and second ports is cut-off within said main cylinder and wherein communication between said brake cylinder port and said bleed port is cut-off within said main cylinder and said brake cylinder is in effective condition, latch means on said said main cylinder arranged to engage said solid piston to retain said normal positions of the main pistons, said latch means being releasable from said solid piston to permit the air pressure from one of said automatic valve ports to work against one of said main pistons to move said piston rod and pistons to positions in which said bleed port and said brake cylinder port are in communication to bleed the brake cylinder, and means whereby a minimum of air in the brake cylinder and valve device can cause movement of the piston assembly to abnormal positions although opposed by a full charged brake pipe or main air line.

5. In an airbrake system comprising a brake cylinder, a main air line, an air reservoir, and an automatic valve, such as an "A B" or triple valve effectively connecting said main air line to said brake cylinder and reservoir, said valve being operative upon a reduction of pressure in said main air line to conduct the reservoir air to said brake cylinder to apply the brake; release valve means connected between said automatic valve and said brake cylinder, said release valve normally occupying a first position effecting communication between said automatic valve and said brake cylinder, said release valve being operable to a second position to cut-off communication between said brake cylinder and said automatic valve and reservoir and hold the air pressure in said reservoir while exhausting said brake cylinder to the atmosphere, said release valve has a piston rod and a manually releasable latch normally retainably engaging said piston rod to retain said valve in its normal position, said release valve comprising a cylinder having a port in communication with said automatic valve, with said piston rod working in said cylinder and having a piston in advance of said port, said piston rod further having a reverse piston working in a portion of said cylinder having communication only with said main airline, whereby in a released position of said latch the reservoir air pressure is effective upon a reduction of main airline pressure to move said piston rod and piston from said first position to said second position, increase of the main airline pressure to normal operating pressure effectively moving said reverse piston to restore said pistons to said first position.

6. In an airbrake system comprising a brake cylinder, a main air line, an air reservoir, and an automatic valve, such as an "A B" or triple valve effectively connecting said main air line to said brake cylinder and reservoir, said valve being operative upon a reduction of pressure in said main air line to conduct the reservoir air to said brake cylinder to apply the brake; release valve means connected between said automatic valve and said brake cylinder, said release valve normally occupying a first position effecting communication between said automatic valve and said brake cylinder, said release valve being operable to a second position to cut-off communication between said brake cylinder and said automatic valve and reservoir and hold the air pressure in said reservoir while exhausting said brake cylinder to the atmosphere, said release valve has a piston rod and a manually releasable latch normally retainably engaging said piston rod to retain said valve in its normal position, said release valve comprising a cylinder having a port in communication with said automatic valve, with said piston rod working in said cylinder and having a piston in advance of said port, said piston rod further having a reverse piston working in a portion of said cylinder having communication only with said main airline, whereby in a released position of said latch the reservoir air pressure is effective upon a reduction of main airline pressure to move said piston rod and pistons from said first position to said second position, increase of the main airline pressure to normal operating pressure effectively moving said reverse piston to restore said pistons to said first position, said latch being arranged to automatically reengage said piston rod to retain the same as said piston rod is restored to said first position.

LAWRENCE W. McALPINE.